(12) United States Patent
Tanaka et al.

(10) Patent No.: US 7,348,060 B2
(45) Date of Patent: Mar. 25, 2008

(54) POROUS AND SPHERICAL CALCIUM PHOSPHATE PARTICLE COMPRISING METAL ION, AND POROUS MULTILAYER CALCIUM PHOPHATE PARTICLE

(75) Inventors: Junzo Tanaka, Ibaraki (JP); Toshiyuki Ikoma, Ibaraki (JP); Tetsushi Taguchi, Ibaraki (JP)

(73) Assignee: National Insititute for Materials Science, Ibaraki (JP)

( * ) Notice: Subject to any disclaimer, the term of this patent is extended or adjusted under 35 U.S.C. 154(b) by 50 days.

(21) Appl. No.: 10/568,680

(22) PCT Filed: Mar. 25, 2004

(86) PCT No.: PCT/JP2004/004149

§ 371 (c)(1),
(2), (4) Date: Mar. 30, 2006

(87) PCT Pub. No.: WO2005/019102

PCT Pub. Date: Mar. 3, 2005

(65) Prior Publication Data

US 2006/0257658 A1 Nov. 16, 2006

(30) Foreign Application Priority Data

Aug. 22, 2003 (JP) ............................. 2003-299362

(51) Int. Cl.
*B32B 5/16* (2006.01)
(52) U.S. Cl. ...................... 428/403; 428/688; 428/689; 428/704
(58) Field of Classification Search ................ 428/403, 428/404, 405, 406, 407, 688, 689, 704
See application file for complete search history.

(56) References Cited

U.S. PATENT DOCUMENTS

| | | | | |
|---|---|---|---|---|
| 3,787,900 A * | 1/1974 | McGee | ........................ | 424/422 |
| 5,658,593 A * | 8/1997 | Orly et al. | ................... | 424/499 |
| 5,964,932 A * | 10/1999 | Ison et al. | ..................... | 106/35 |
| 6,340,648 B1 * | 1/2002 | Imura et al. | .................. | 501/80 |
| 6,358,532 B2 * | 3/2002 | Starling et al. | ............. | 424/489 |
| 6,808,561 B2 * | 10/2004 | Genge et al. | ................ | 106/690 |
| 7,094,282 B2 * | 8/2006 | Lin et al. | ....................... | 106/35 |
| 2005/0119761 A1 * | 6/2005 | Matsumoto | .............. | 623/23.56 |

FOREIGN PATENT DOCUMENTS

| | | |
|---|---|---|
| JP | 3-141956 A | 6/1991 |
| JP | 4-317404 A | 11/1992 |
| JP | 6-319500 A | 11/1994 |
| JP | 2000-42096 A | 2/2000 |
| JP | 2001-270709 A | 10/2001 |

* cited by examiner

*Primary Examiner*—H. T Le
(74) *Attorney, Agent, or Firm*—Wenderoth, Lind & Ponack, L.L.P.

(57) ABSTRACT

A porous and spherical calcium phosphate particle which is substituted with a metal ion or has a metal ion carried on the surface thereof, and has a particle diameter of 0.1 to 100 µm. The calcium phosphate particle is a novel functional particle which is useful, for example, as a material for use in gas chromatography allowing the separation of a chemical substance of a trace amount with high accuracy.

12 Claims, 3 Drawing Sheets

POROUS AND SPHERICAL CALCIUM PHOSPHATE PARTICLE COMPRISING METAL ION, AND POROUS MULTILAYER CALCIUM PHOPHATE PARTICLE

TECHNICAL FIELD

The invention of this application relates to a porous and spherical particle and porous multilayer particle of calcium phosphate, useful for a scaffold for cell propagation, a material for use in chromatography, and the like.

BACKGROUND ART

Conventionally, a method for producing a spherical particle of calcium phosphate by spraying calcium phosphate with a sprayed drier is known (for example, Patent Documents 1 to 3). Further, a sintered product or porous material, obtained by substituting part of tricalcium phosphate with zinc, a cement material thereof, and the like are also already known.

Actually, spherical particles of calcium phosphate are utilized in a dental cement, a material for chromatography, and the like. The particles of calcium phosphate are well known as bio-adaptable materials, or bio-related materials such as DDS carrier, and expansion of its utilization is expected. In particular, formation of multilayer with bio-related materials, improvement of functionality by carrying those, and formation of a composite are expected.

Patent Document 1: JP-A-62-230607
Patent Document 2: JP-A-1-152580
Patent Document 3: JP-A-4-175213

DISCLOSURE OF THE INVENTION

However, it is the present status that conventionally, investigations have not substantially been advanced on the properties with which calcium phosphate particles should be provided for improvement of such a functionality or formation of a composite, and on the requirements for formation of a multilayer and for deposition carrying. In fact, regarding, for example, a method for producing a composite of, for example, a polymer and calcium phosphate spherical particles, the method is limited to that calcium phosphate spherical particles are merely coated with a polymer material such as polysaccharides or collagen, and a structure of a coating or a composite, and a method of adjusting their states and the like in nano order are not known.

Accordingly, the objects of the invention of this application are to overcome the limits and problems of the prior arts mentioned above, and to provide a novel particle of calcium phosphate useful as a material for use in chromatography that can precisely separate even a chemical substance in a trace amount by formation of a multilayer to the particles, and having adjusted structure and properties, a sintered product thereof, and a composite thereof.

To achieve the above objects, the invention of this application provides firstly a porous multilayer calcium phosphate spherical particle, characterized in that a porous and spherical calcium phosphate particle having a particle diameter in a range of from 0.1 to 100 µm, wherein the calcium phosphate is substituted with a metal ion or has a metal ion carried on the surface thereof, in a range of from 0.0001 to 10 wt %, is covered with a porous inorganic material. The invention provides secondly the porous multilayer spherical particle, characterized in that the porous and spherical calcium phosphate particle has a porosity by a specific surface area/pore distribution measurement with BET method (specific surface area measurement method) of 20% or more, and a specific surface area of 20 m$^2$/g or more; thirdly the porous multilayer spherical particle, characterized in that the porous and spherical calcium phosphate particle is a porous particle formed from microcrystal of calcium phosphate by spray drying or the like; fourthly the porous multilayer spherical particle, wherein the metal ion for substitution or surface carrying is at least one of ions of zinc, magnesium, iron and copper; fifthly a porous multilayer calcium phosphate spherical particle, which is obtained by sintering the porous and spherical calcium phosphate particle at a temperature in a range of from 100 to 800° C.; sixthly the porous multilayer calcium phosphate spherical particle, wherein the porous and spherical calcium phosphate particle is covered with a bio-adaptable polymer such as a biopolymer or a polyethylene glycol, or has the same carried thereon; seventhly the porous multilayer calcium phosphate spherical particle, characterized in that the porous inorganic material is a calcium phosphate-based material or a calcium carbonate-based material; the porous multilayer calcium phosphate spherical particle, characterized in that a bio-adaptable polymer such as a biopolymer or polyethylene glycol is carried on the surface or inside thereof and ninthly the porous multilayer calcium phosphate spherical particle, characterized in that the biopolymer is glycosaminoglycan.

MODE FOR CARRYING OUT THE INVENTION

Figure 1:
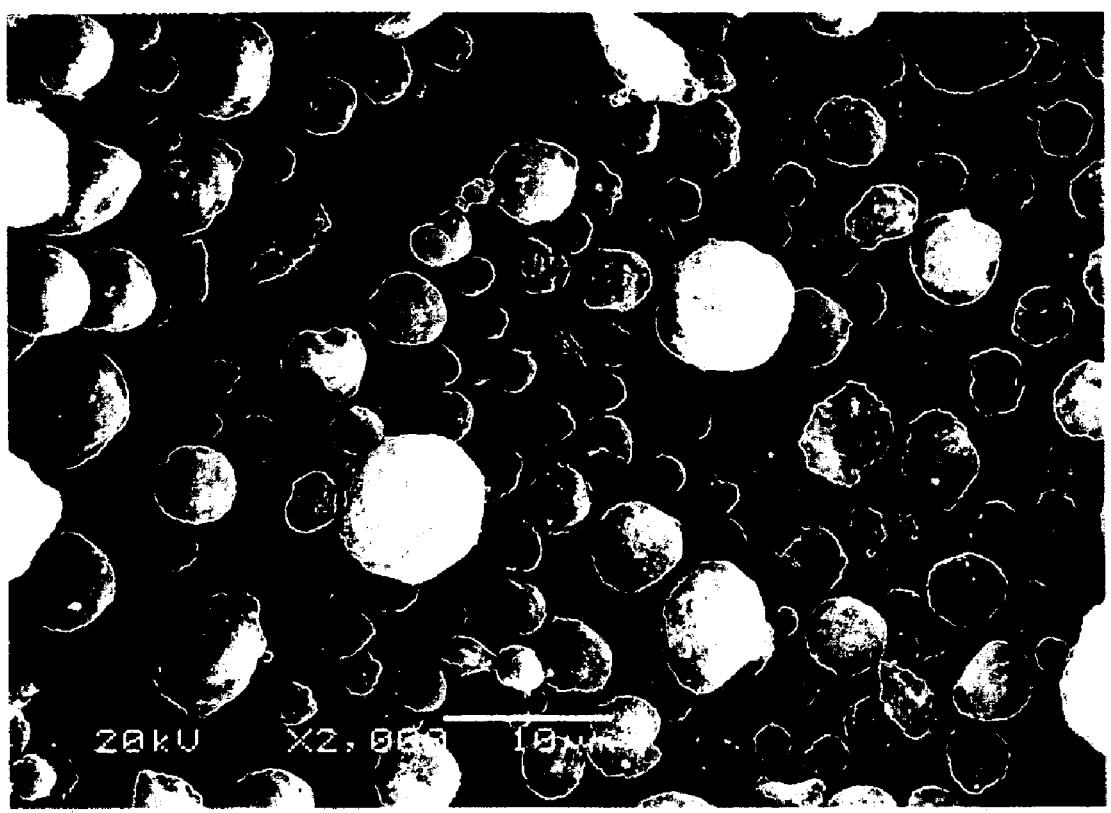
FIG. 1 is an electron microphotograph of a porous and spherical particle produced by the method of this invention.
Figure 2:
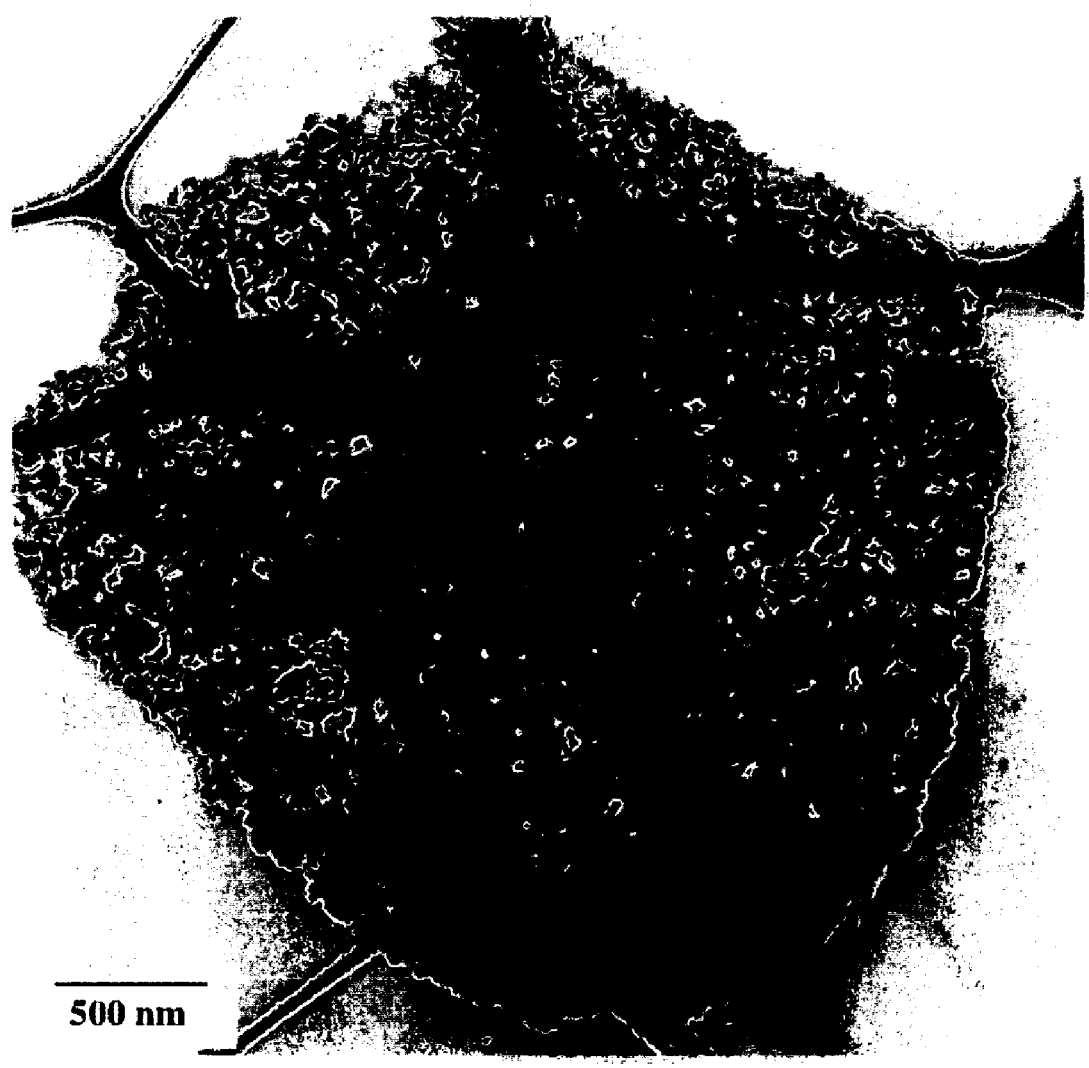
FIG. 2 shows an image of a transmission electron microscope in Example 3.

The invention of this application has the above-mentioned characteristics, but the embodiment is described below.

It is well known that metal ions have high bondability to many polymers. The invention of this application utilizes such properties, and improves the bondability to various polymers, particularly biopolymers, by substituting part of constitutent of calcium phosphate-based microcrystal with metal ions, or carrying the metal ions on the surface thereof, thereby forming a porous and spherical particle, while maintaining bio-adaptability of calcium phosphate. The invention of this application further increases adsorptivity by covering the surface of the porous and spherical particle from calcium phosphate-based microcrystal, which is partly substituted with a metal ion or has a metal ion carried on the surface thereof, with a porous inorganic material.

Thus, a functional material which has properties as a composite material of an organic material and an inorganic material and is useful for a scaffolding material for cell propagation, an air cleaning filter, a material for use in chromatography, and the like is provided by increasing bondability and adsorptivity of the surface of calcium phosphate.

The porous calcium phosphate particle of the invention of this application has basic characteristics that:

A) it is partly substituted with a metal ion or has metal ion carried on the surface thereof;

B) a particle diameter is in a range of from 0.1 to 100 µm; and

C) it is a porous and spherical particle.

With respect to the metal ion in this case, the kind may be selected from various kinds, corresponding to the use purpose and object of the porous and spherical particle. Generally, representative examples include zinc (Zn), magnesium (Mg), iron (Fe) and copper (Cu). Other than those, titanium (Ti), zirconium (Zr), aluminum (Al), tin (Sn), silver (Ag) and the like may be considered.

The calcium phosphate may be various kinds including the conventional apatite. Partial substitution or surface carrying of calcium phosphate with the metal ion may be substitution of calcium which is the constituent atom, or may be that the metal ion is carried on the surface by ionic bond or ionic adsorption.

The porous and spherical calcium phosphate particle having a particle diameter in a range of from 0.1 to 100 μm which is partly substituted or carried with the metal ion is not yet known.

Where the particle diameter is less than 0.1 μm or exceeds 100 μm, it is difficult to produce a porous and spherical particle.

Although the shape is defined as spherical, a distorted shape, an ellipse and the like are included in the definition of "spherical".

To use as a carrier or a carrier material, the porous and spherical calcium phosphate particle of the invention of this application preferably has a porosity by a specific surface area/pore distribution measurement with BET method (specific surface area measurement method) of 20% or more, and a specific surface area of 20 m$^2$/g or more. The porosity in this case is calculated by the following equation.

Porosity=BET total volume/(BET total volume+volume of apatite)

Density of apatite=3.16 g/cm$^3$→volume of apatite=1/3.16

Regarding the above porous and spherical calcium phosphate particle of the invention of this application, a spherical particle formed from microcrystal of calcium phosphate by spray drying or the like is shown as a preferable particle. In this case, for example, the spherical particle can be formed by spray drying a microcrystal suspension formed by mixing a phosphoric acid aqueous solution and a calcium phosphate suspension in the presence of a metal compound such as metal salt.

The spherical fine particle can also be formed by synthesizing a calcium phosphate microcrystal which is partly substituted with a metal ion or has a metal ion carried on the surface thereof by such a wet process or dry process, and then spraying with a spray dry method. Further, the particle obtained may be sintered at from 100 to 800° C.

Size of the microcrystal of calcium phosphate is not limited, but the particle diameter is preferably from about 1 nm to about 100 nm, and further preferably from about 5 nm to about 50 nm, taking into consideration physical properties, workability and the like.

The porous and spherical calcium phosphate particle which is substituted with a metal ion or has a metal ion carried on the surface thereof can be covered with a polymer, for example, a bio-adaptable polymer such as a biopolymer or a polyethylene glycol, or can have the polymer carried, in the inside or on the surface thereof. The biopolymer is considered as at least one kind constituting a living tissue, and examples thereof include glycosaminoglycan such as hyaluronic acid or chondroitin sulfuric acid. Further, the porous particle may have a porous inorganic material carried, or may be covered with the same, in the inside of pores thereof, or on the surface thereof. Moreover, the covered material may have the same polymer such as a biopolymer carried in the inside or on the surface thereof.

Carrying or covering with a polymer or a porous inorganic material can be carried out by various methods, and is realized by, for example, means of dipping the porous calcium phosphate particle in their aqueous solution or suspension, spraying to the porous calcium phosphate particle, or reaction accumulation.

Needless to say, the amount (proportion) of carrying or covering may appropriately be determined according to the purpose of utilization or purpose of use of the porous particle or porous multilayer particle obtained.

The porous inorganic material used for covering is preferably a calcium phosphate-based material or a calcium carbonate-based material.

The invention of this application is described in more detail by reference to the following Examples. However, the invention should not be limited to the following Examples.

EXAMPLE

Example 1

1.36 g or 13.6 g of zinc chloride was dissolved in 1 liter of a phosphoric acid aqueous solution (0.6 mol/l) to prepare two kinds of samples. Each of those two samples was added to 2 liters of a calcium hydroxide suspension (0.5 mol/l) at a dropping rate of 20 ml/min while stirring. A zinc (Zn) ion-carried apatite suspension thus obtained was sprayed with a spray drier using two fluid nozzles maintained at 180° C. to prepare a spherical particle. The spherical particle had a particle diameter in a range of from 1 to 10 μm. The attached FIG. 1 shows an image of a scanning electron microscope (SEM).

A solution prepared by dispersing 30 mg of chondroitin sulfuric acid (ChS) in 10 ml of purified water was added to 500 mg of the spherical particles obtained above. The resulting mixture was subjected to suction filtration while washing with purified water, followed by freeze drying.

For the sake of comparison, apatite spherical particles produced in the same manner as above except that zinc chloride was not dissolved were treated under the same conditions as above, and then subjected to freeze drying.

Three kinds of spherical particles thus prepared were analyzed with infrared spectrum (IR), thermal analysis (TG-DTGA), scanning electron microscope observation (SEM) and energy dispersion type X ray (EDX). From IR measurement, $SO_3$ which is a functional group of ChG was observed in the zinc-containing apatite. However, $SO_3$ was not observed in the apatite not containing zinc. As a result of thermal analysis, heat generation which is inherent in ChG was observed around 300° C. in the zinc-containing apatite, but heat generation was not observed in the apatite not containing zinc. In EDX analysis, the zinc-containing apatite showed spectrum which is inherent in sulfur, but the spectrum was not observed in the apatite not containing zinc. The chondroitin sulfuric acid (ChS) content increased from about 2 wt % to about 4 wt % according to the content of zinc.

Example 2

Using the spherical particle produced in Example 1, 30 ml of hyaluronic acid (HyA) in place of chondroitin sulfuric acid (ChS) was dispersed in 10 ml of purified water. The resulting mixture was subjected to suction filtration while washing with purified water, followed by freeze drying. As a result of thermal analysis, where the zinc-containing apatite was used, heat generation which is inherent in hyaluronic acid (HyA) was observed around 300° C. Hyaluronic acid (HyA) content was almost the same amount as the case of using chondroitin sulfuric acid (ChS).

Example 3

A thin piece was formed from the apatite spherical particles produced in Example 1 (13.6 g: zinc chloride), and its internal structure was observed with a transmission electron microscope. It was confirmed that the spherical particle obtained was a porous body having inner cavity.

Example 4

The apatite spherical particles produced in Example 1 (13.6 g: zinc chloride) were dipped in 1 mol/l liter calcium chloride solution, and after centrifuge, further dipped in 1 mol/l liter $NaHCO_3$ solution. As a result of measuring X ray analysis of a composite obtained, calcium carbonate was detected. Further, as a result of its weight change by thermal analysis, it was clarified that 12 wt %, per apatite, of calcium carbonate was contained. As a result of SEM observation, crystal of calcium carbonate was not observed on the surface of apatite. From this fact, it was confirmed that calcium carbonate was present in the inside of the apatite spherical particle.

Example 5

Figure 3:
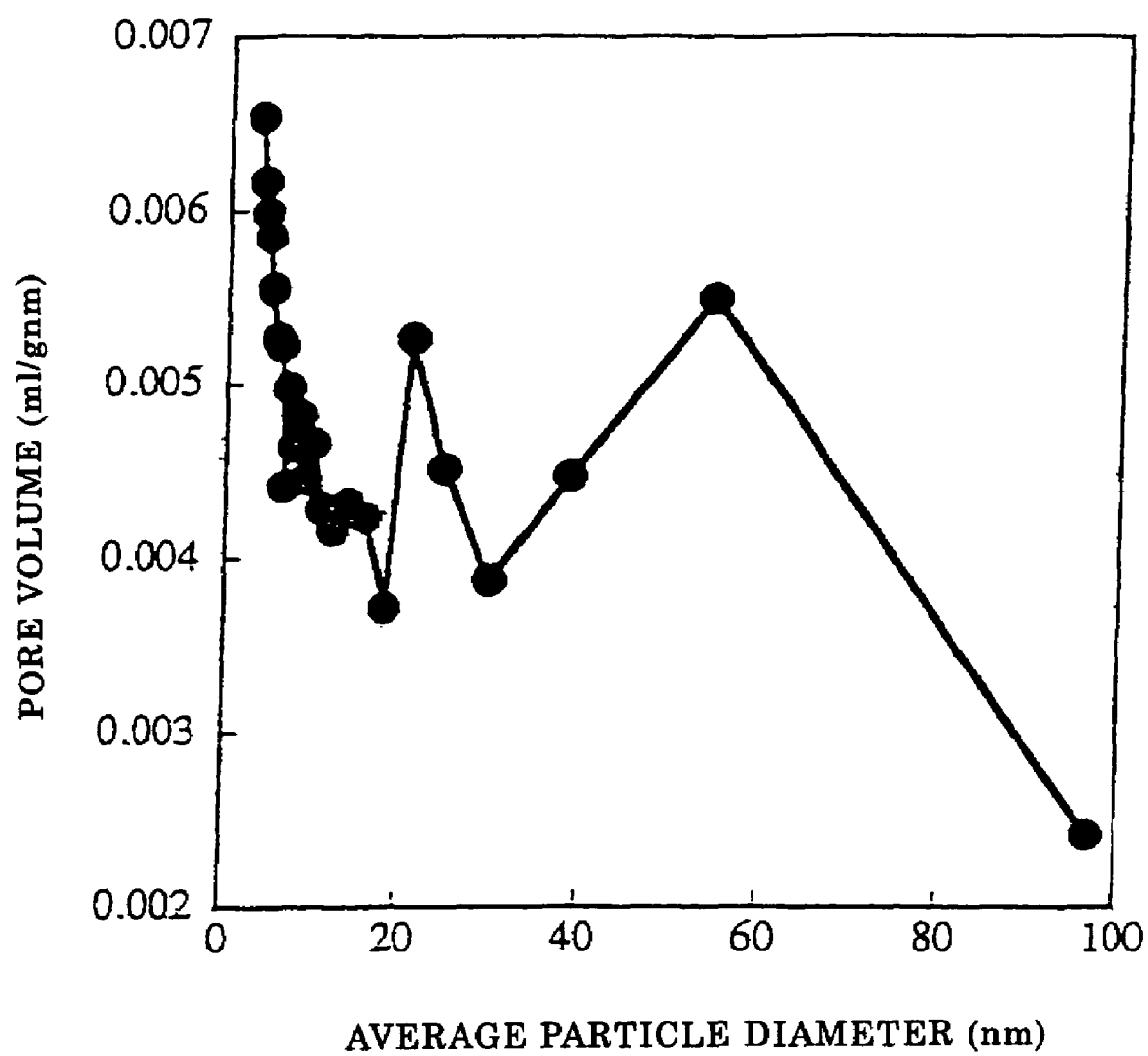
FIG. 3 is a pore distribution view measured by BET method when sintered at 180° C.

The apatite particles produced in Example 1 (13.6 g: zinc chloride) were sintered at each temperature, and were subjected to a specific area/pore distribution measurement using nitrogen gas by BET method (specific area measurement method). The specific area/BET total volume decreased according to the sintering temperature. For example, in sintering at 180° C., specific surface area 88 $m^2/g$, BET total volume 0.44 ml/g and porosity 58%; in sintering at 600° C., specific surface area 56 $m^2/g$, BET total volume 0.24 ml/g and porosity 43%; and in sintering at 800° C., specific surface area 45 $m^2/g$, BET total volume 0.13 ml/g and porosity 29%. However, pore was not almost detected in the sample sintered at 1,200° C. Further, in the case of sintering at 180° C., the pore distribution showed the maximum distribution at 60 nm by BET method. A graph showing this relationship is FIG. 3.

In each sintering at the above respective sintering temperatures, it was confirmed that agglomeration of particles did not substantially occur.

INDUSTRIAL APPLICABILITY

As described in detail above, the invention of this application provides a novel functional particle of calcium phosphate having controlled structure and properties, which is useful as a material for chromatography that can accurately separate even a trace amount of chemical substance by multilayer formation of particles with a biopolymer or a porous inorganic material, while maintaining characteristics of calcium phosphate as a bio-adaptable material, its sintered body, and their composites.

The invention claimed is:

1. A porous multilayer calcium phosphate spherical particle, comprising a porous and spherical calcium phosphate particle having a particle diameter in a range of from 0.1 to 100 μm, wherein the porous and spherical calcium phosphate particle is substituted with a metal ion or has a metal ion carried on the surface thereof, in a range of from 0.0001 to 10 wt %, and has a porous inorganic material carried in the inside of pores thereof.

2. The porous multilayer calcium phosphate spherical particle as claimed in claim 1, wherein the porous and spherical calcium phosphate particle has a porosity by a specific surface area/pore distribution measurement with BET method (specific surface area measurement method) of 20% or more, and a specific surface area of 20 $m^2/g$ or more.

3. The porous multilayer calcium phosphate spherical particle as claimed in claim 1, wherein the porous and spherical calcium phosphate particle is a porous particle formed from microcrystal of calcium phosphate by spray drying or the like.

4. The porous multilayer calcium phosphate spherical particle as claimed in claim 1, wherein the metal ion for substitution or surface carrying is at least one of ions of zinc, magnesium, iron and copper.

5. A porous multilayer calcium phosphate spherical particle, which is obtained by sintering the porous and spherical calcium phosphate particle as claimed in claim 1 at a temperature in a range of from 100 to 800° C.

6. The porous multilayer calcium phosphate spherical particle as claimed in claim 1, wherein the porous and spherical calcium phosphate particle is covered with a bio-adaptable polymer, or has the bio-adaptable polymer carried thereon.

7. The porous multilayer calcium phosphate spherical particle as claimed in claim 6, wherein the bio-adaptable polymer is a biopolymer or a polyethylene glyco.

8. The porous multilayer calcium phosphate spherical particle as claimed in claim 7, wherein the biopolymer is glycosaminoglycan.

9. The porous multilayer calcium phosphate spherical particle as claimed in claim 1, wherein the porous inorganic material is a calcium phosphate-based material or a calcium carbonate-based material.

10. The porous multilayer calcium phosphate spherical particle as claimed in claim 1, wherein a bio-adaptable polymer is carried thereon.

11. The porous multilayer calcium phosphate spherical particle as claimed in claim 10, wherein the bio-adaptable polymer is a biopolymer or a polyethylene glycol.

12. The porous multilayer calcium phosphate spherical particle as claimed in claim 11, wherein the biopolymer is glycosaminoglycan.

* * * * *